United States Patent
Ahouanto et al.

[11] Patent Number: 5,961,756
[45] Date of Patent: Oct. 5, 1999

[54] PNEUMATIC TIRE WITH ANNULAR MEMBER INSTEAD OF BEAD WIRE

[75] Inventors: Michel Ahouanto, Enval; Claude Eynard, Chanat-La-Mouteyre; Andre Peyrot, Clermont-Ferrand, all of France

[73] Assignee: Compagnie Generale des Etablissements Michelin-Michelin & Cie, Cedex, France

[21] Appl. No.: 08/903,841

[22] Filed: Jul. 31, 1997

[30] Foreign Application Priority Data

Aug. 9, 1996 [FR] France ................................. 96 10187

[51] Int. Cl.⁶ .......................... B60C 15/00; B60C 15/04; B60C 15/06
[52] U.S. Cl. .......................... 152/540; 152/539; 152/542; 152/543; 152/546; 152/547; 152/564
[58] Field of Search ................................. 152/539, 540, 152/542–543, 541, 546, 547, 564

[56] References Cited

U.S. PATENT DOCUMENTS 2,966,933  1/1961  Boussu et al. .
3,072,171  1/1963  Drakeford et al. .
5,415,216  5/1995  Kajiwara et al. .

FOREIGN PATENT DOCUMENTS 0664233  7/1995  European Pat. Off. .
0672547  9/1995  European Pat. Off. .

Primary Examiner—Adrienne C. Johnstone
Attorney, Agent, or Firm—Baker & Botts, L.L.P.

[57] ABSTRACT

Each bead of a pneumatic tire has the following characteristics:

a) it has no bead wire and has an annular element whose tensile strength is appreciably less than that necessary for a bead wire;

b) at least two reinforcing plies are placed in contact with or near this annular element;

c) the combination of reinforcing plies has a tensile strength at least equal to that which would be necessary for a bead wire;

d) the carcass ply is wrapped around the annular element;

e) the outer region of the bead includes a rubber having an elastic loss modulus G" of less than 1 MPa and/or it includes a rubber whose thickness is at most equal to 2 mm.

15 Claims, 4 Drawing Sheets

PNEUMATIC TIRE WITH ANNULAR MEMBER INSTEAD OF BEAD WIRE

BACKGROUND OF THE INVENTION

The invention relates to pneumatic tires.

Patent FR-A-1,169,474 describes a pneumatic tire with no bead wire, which includes, at the point of anchoring on the rim, small cord plies, the cords of which are mutually parallel in each ply and are highly inclined with respect to the parallel attachment, the various plies being crossed with each other. The object of this patent is to facilitate the manufacture of the tire by virtue of there being no bead wire, since the need to manufacture a bead wire is thus eliminated. However, production of this tire poses problems since it is difficult to guarantee that its elements are satisfactorily held in place during the building-up, shaping and curing steps, and the finished tire does not allow it to exhibit satisfactory rolling endurance.

Patent Application EP-A-672,547 describes a pneumatic tire with no bead wire, which includes an annular element whose tensile strength is appreciably less than that which would be necessary for a bead wire in a known tire of the same size, and at least two reinforcing plies in contact with or near the annular element, the combination of these plies having a tensile strength at least equal to that which would be necessary for a bead wire in a known tire of the same size. This tire exhibits good rolling endurance.

The object of the invention is to improve this known tire.

SUMMARY OF THE INVENTION

The pneumatic tire according to the invention, which includes a crown, two beads and at least one carcass ply extending from one bead to the other, is characterized in that each bead has the following features:

a) it has no bead wire and includes an annular element whose tensile strength in the longitudinal direction is appreciably less than that which would be necessary for a bead wire in a known tire of the same size, the axis of this annular element being the axis of revolution of the tire;

b) at least two adjacent plies called "reinforcing plies" are placed in contact with the annular element, or near this annular element; these reinforcing plies each include mutually parallel reinforcing cords, these cords being crossed from one ply to another; in each reinforcing ply, the angle $\alpha$ is the acute angle formed, at any point on a cord, by the direction of this cord and the tangent to a circle having as axis the axis of revolution of the tire and passing through this point on the cord, this angle $\alpha$ satisfying the relationship $0°<\alpha\leq 10°$, the measurement being taken in a region where the reinforcing plies are practically oriented in mutually parallel planes;

c) the combination of the reinforcing plies has a tensile strength, measured in the longitudinal direction, at least equal to that which would be necessary for a bead wire in a known tire of the same size;

d) the carcass ply is wrapped around the annular element; and e) that outer region of the bead which is intended to be placed on the side of the standard rim, at least in the area of the top of the rim flange, when the tire is fitted onto this rim, fulfills at least one of the following conditions:

it comprises a rubber which, in the vulcanized state, has an elastic loss modulus $G''$ of less than 1, $G''$ being expressed in MPa (megapascals) and the measurement of $G''$ being taken at a shear strain of 10%, at 50° C. and at a frequency of 10 Hz;

it comprises a rubber whose thickness is at most equal to 2 mm.

The invention will be readily understood with the aid of the examples which follow, described with reference to the drawings, all diagrammatic.

DESCRIPTION OF PREFERRED EMBODIMENTS

Figure 1:
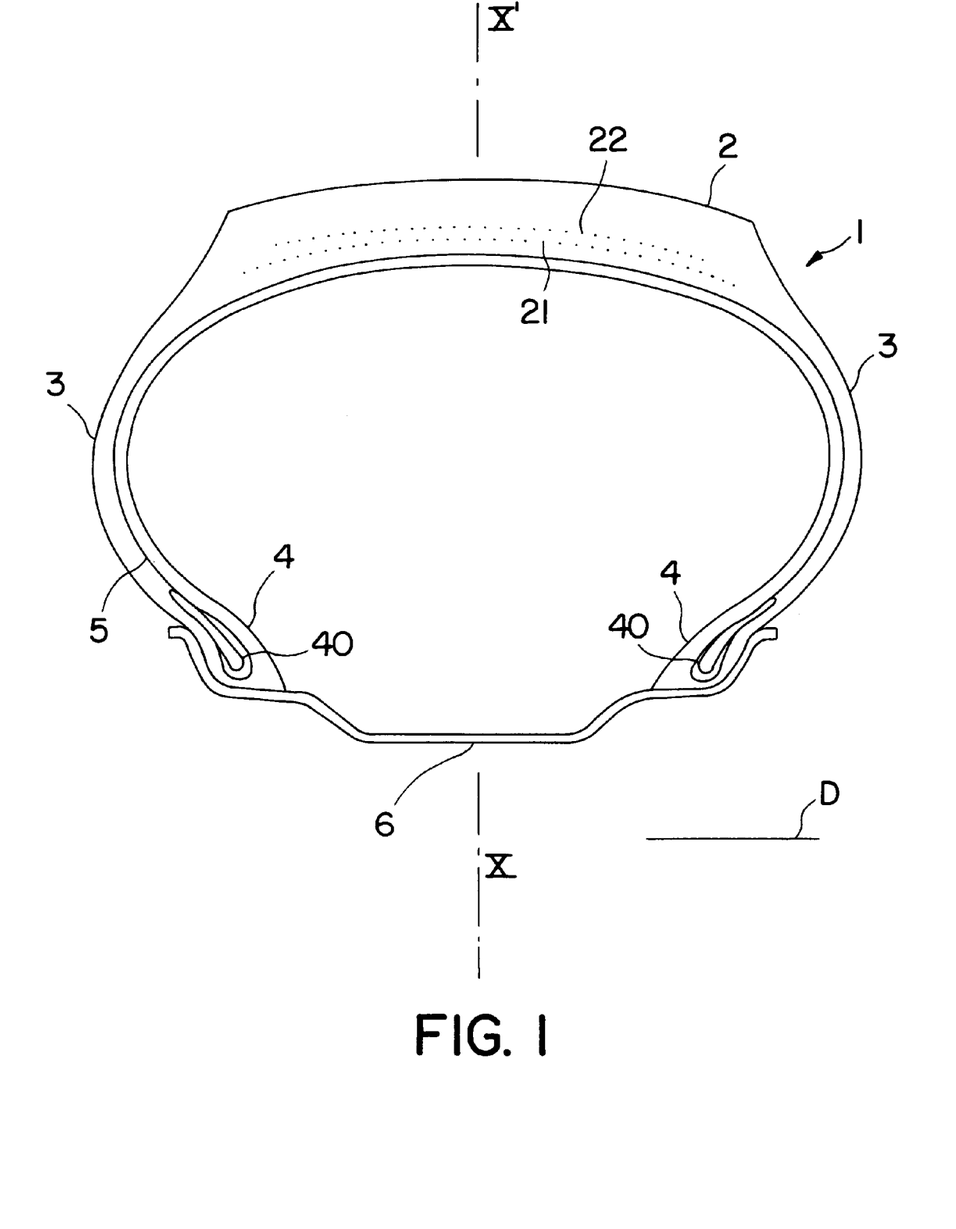
FIG. 1 shows, in radial cross section, a pneumatic tire according to the invention, having two beads.

FIG. 1 shows a pneumatic tire 1 according to the invention. FIG. 1 is a radial cross section, i.e. a cross section made on a plane passing through the axis of rotation of the cover 1, this axis, not shown in FIG. 1, being parallel to the straight line D. This tire 1 includes a crown 2, reinforced in a known manner by two crown plies 21, 22, two sidewalls 3 and two beads 4. Each bead 4 comprises a reinforcing assembly 40 which will be described in more detail below.

A carcass ply 5, for example a radial carcass ply, extends from one bead 4 to the other, passing through the crown 2 and the sidewalls 3.

The tire 1 is fitted onto the standard rim 6, the equatorial plane of the tire being shown diagrammatically by the line XX', this plane passing through the middle of the crown 2 and being perpendicular to the axis of rotation of the tire.

Figure 2:
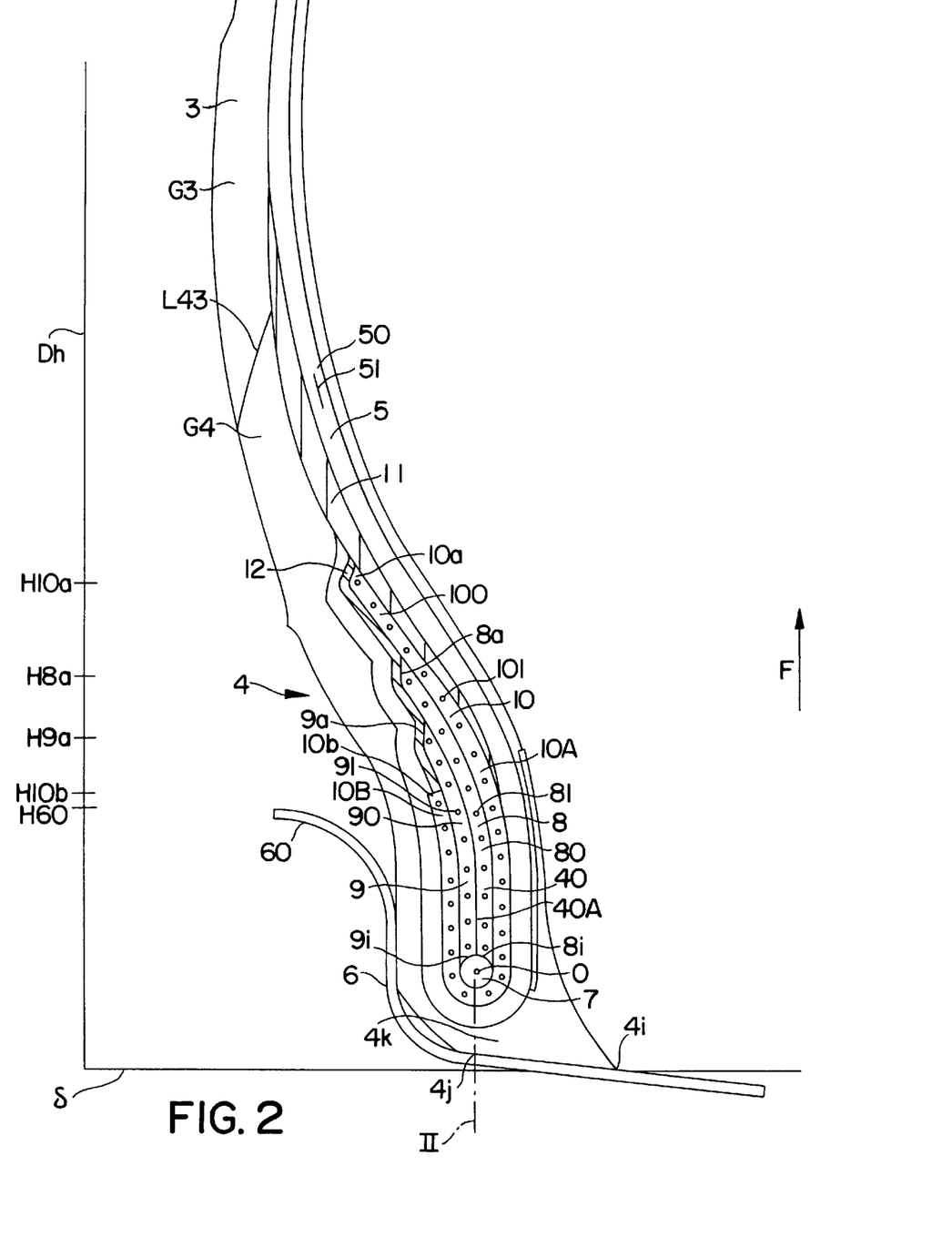
FIG. 2 shows, in more detail, in radial cross section, a bead of the tire shown in FIG. 1.

FIG. 2 shows a bead 4 of the tire 1 in more detail. This bead 4 includes an annular element 7, for example, a circular cord, the axis of this circle being the axis of revolution of the tire.

In the rest of the text, the term "rubber", used for the purpose of simplification, denotes in a known manner a rubber composition which includes at least one rubber material and the usual ingredients used in the tire industry, for example a vulcanizing agent, especially sulfur, a vulcanizing accelerator, an antioxidant and fillers, for example carbon black or silica. Such a composition is in the unvulcanized state while the tire is being built and in the vulcanized state in the finished tire.

Two adjacent reinforcing plies 8 and 9 have their respective lower ends $8i$, $9i$ in contact with the annular element 7 and they extend above this element 7, i.e. they are closer to the crown 2 than the element 7. These plies 8, 9 comprise each, a rubber 80, 90 in which reinforcing cords 81, 91 are arranged. A reinforcing ply 10 extends around the element 7 and the plies 8, 9, thus forming two elementary plies 10A, 10B applied against the plies 8, 9 which are thus arranged sandwiched between the elementary plies 10A, 10B, the plies in contact with each other 10A, 8, 9, 10B, called hereafter "reinforcing plies", being substantially parallel to each other. The ply 10 comprises a rubber 100 in which reinforcing cords 101 are arranged. The assembly consisting of the element 7 and the plies 10A, 8, 9, 10B is given the reference 40 and the combination of these plies, without the element 7, is given the reference 40A.

Figure 3:
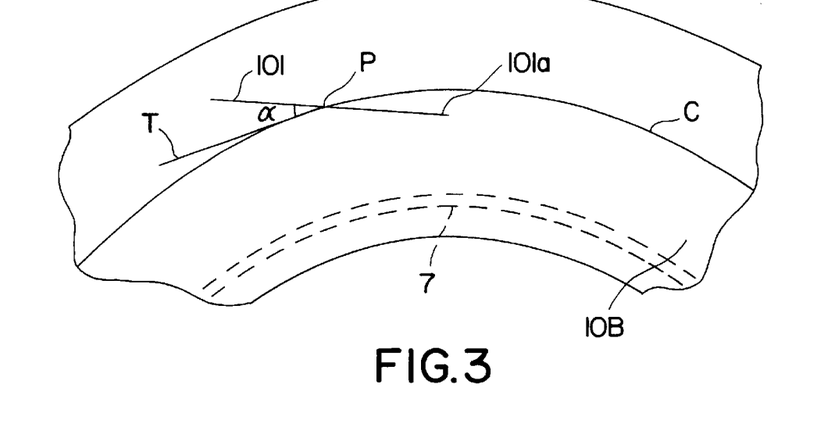
FIG. 3 shows, in side view, part of the bead shown in FIG. 2.

In any given reinforcing ply, 8, 9, 10A, 10B, the cords of this ply are mutually parallel and make an acute angle α, defined at any point on the cord, between the direction of this cord and the tangent to a circle having as axis the axis of revolution of the tire and passing through this point. FIG. 3 shows a portion of the elementary ply 10B seen from the side in a direction parallel to the axis of revolution of the tire 1. In this figure may be seen a practically straight cord portion 101, shown by the straight-line segment 101a and part of a circle C passing through a point P on this cord portion, the circle C having as axis the axis of revolution of the tire 1, the tangent to the circle C at P being given the reference T. The angle α is therefore the acute angle defined by T and 101a, the measurement being taken at the point where the plies 10A, 8, 9, 10B are practically oriented in mutually parallel planes.

For each ply 10A, 8, 9, 10B, the angle α varies depending on the position of the point P, but it is always greater than 0° and at most equal to 10°.

The cords of one reinforcing ply are crossed with the cords of the adjacent reinforcing ply or plies, that is to say that the cords of two adjacent plies are not mutually parallel. Thus, for example, the cords 81 of the ply 8 are crossed with the cords 101 of the adjacent ply 10A and with the cords 91 of the adjacent ply 9, the cords 101 of the ply 10A being crossed with the cords 101 of the ply 10B since these plies 10A, 10B are formed by the turn-up of the same ply 10 around the element 7.

The term "cord" must be taken in a very general sense for the element 7 and the cords 81, 91 and 101, such a cord possibly consisting of a monofilament or multifilament yarn or by an assembly of such yarns twisted together, forming in particular cables or twist yarns. The material of which these cords are composed can vary it may, for example, be a metal, in particular steel, it may be an organic polymer, for example one made of a cellulose material or of a non-aromatic or aromatic polyamide or polyester, in particular aramid cords, or it may also be an inorganic material, for example glass or carbon, each cord possibly comprising several such materials.

The annular element 7 has a tensile strength, measured in the longitudinal direction, which is appreciably less than that which would be necessary for a bead wire in a known tire of the same size, and the combination 40A of the reinforcing plies has a tensile strength, measured in the longitudinal direction, at least equal to that which would be necessary for a bead wire in a known tire of the same size. Longitudinal direction is understood to mean that of a circle having as axis the axis of revolution of the tire and passing through the bead wire, in the case of the known tire, or through the combination of the reinforcing plies, in the case of the tire according to the invention. The mechanical strength of these reinforcing plies is therefore the major contribution to the mechanical strength of the reinforcing assembly 40 consisting of the element 7 and the plies 8, 9, 10, this assembly thus enabling the bead wire of a conventional tire to be replaced.

The carcass ply 5 is wrapped around the assembly 40 and therefore around the element 7. This carcass ply 5 comprises, in a known manner, a rubber 50 in which the reinforcing cords 51 are arranged, the term "cord" having the general meaning given above. For the sake of clarity of the drawing, only one portion of the cord 51 is shown in FIG. 2. The M10 modulus of the rubber 50 is preferably appreciably less than the M10 modulus of the rubbers 80, 90, 100.

Two rubbers 11, 12, called decoupling rubbers, are arranged between the carcass ply 5 and the assembly 40. The M10 value of the rubbers 11, 12 is preferably between that of the rubber 50 on the one hand and that of the rubbers 80, 90, 100 on the other hand.

The decoupling rubbers 11, 12 could be replaced by a single rubber, for example a continuous rubber in the bead region, arranged between the carcass 5 and the assembly 40.

In the aforesaid and in what follows, M10 represents, for a given rubber, the ratio between the tensile stress σ10 for a strain δL/L of 10% and this strain, L being the initial length of the test piece and δL being the elongation of the test piece. M10 therefore=σ10[δL/L]$^{-1}$=10σ10. This modulus M10 is defined in accordance with the AFNOR-NF-T46-002 standard of September 1988, under the standard temperature and hygrometry conditions according to the AFNOR-NF-T40-101 standard of December 1979. The M10 values of the rubbers 80, 90, 100 can be the same or different and the M10 values of the rubbers 11, 12 may also be the same or different.

With regard to FIG. 2, those ends of the plies 8, 9 which are opposite the element 7 are given the references 8a, 9a. Likewise, those ends of the elementary plies 10A, 10B which are not in contact with the element 7 are denoted respectively by 10a, 10b. All the ends 8a, 9a, 10a, 10b, called the upper ends, lie within the bead 4.

The rubber 11 is arranged on the outside of the assembly 40, against the upper part of the ply 10A, and extends above the assembly 40 into the sidewall 3, and the rubber 12 is applied between the ends 10a and 10b, being in contact with the four plies 10A, 8,9, 10B.

All these upper ends are arranged at different heights in the plane of FIG. 2: on going toward the crown in the direction of the vertical arrow F, parallel to the vertical equatorial plane, the ends 10b, 9a, 8a, 10a are in the order of increasing heights, that is to say that the thickness, and therefore the stiffness, of the assembly 40 decreases on going upward, in the direction of the arrow F. The increasing heights H10b, H9a, H8a, H10a, corresponding respectively to the ends 10b, 9a, 8a, 10a, are shown on the vertical line Dh starting from the horizontal line δ passing through the bottom end 4i of the bead 4.

When the tire 1 is fitted onto the rim 6, as shown in FIG. 2, the height H10a of the end 10a, i.e. the upper end of the assembly 40, is greater than the height H60 corresponding to the top of the rim flange 60. Under these conditions, the bead 4 exhibits important stiffness in its bottom region, in contact with the rim 6, and near the latter, above the top of the rim flange 60, thereby enabling the bead 4 to be held in place on the rim 6.

In the radial cross section in FIG. 2, the point 4j lies on the bottom surface of the bead 4, under the assembly 40, in a plane π passing through the axis O of the annular element 7. When the tire 1 is in the free state, i.e. not fitted onto the rim 6, the point 4j lies closer to the axis of rotation of the tire 1 than in a known tire having a conventional bead wire in the free state, that is to say that the diameter of the circle formed by the end 4j about this axis is less than the corresponding diameter of such a known tire not fitted onto its rim, the difference in these diameters being, for example, between 0.5% and 5% and preferably between 0.5% and 2%, this difference being advantageously about 1%. In this way, the tire 1 is well anchored on the rim 6 due to the compression of the bottom part of the bead which, on the rim 6, assumes the same diameter as a known tire having a conventional bead wire, the rim 6 being a conventional rim in all cases.

The annular element 7 has a tensile strength, measured in the longitudinal direction, of preferably less than 500 daN, and advantageously less than 300 daN, that is to say that this element has a mechanical strength very much less than that which would be necessary for a bead wire, the tire 1 thus being devoid of a conventional bead wire. However, this tensile strength is chosen so as to permit the building-up, turning-up, shaping and vulcanizing operations in manufacturing the tire 1, these operations, known per se, being, for example, described in the aforementioned application EP-A-672,547. The element 7 therefore has a mechanical strength very much less than that of a conventional bead wire, the element 7 therefore not acting as a bead wire but as an element enabling the plies 10A, 8, 9, 10B to be positioned with respect to each other.

The combination 40A of the reinforcing plies preferably has a tensile strength, measured in the longitudinal direction, of greater than 800 daN and advantageously greater than 1000 daN.

The bead 4 comprises a rubber G4 intended to come into contact with the rim, i.e. in the outer region of the bead. The junction line L43 between the rubber G4 and the rubber G3 covering the outside of the sidewalls 3 lies above the height H10$a$ and therefore above the top of the rim flange 60. The rubbers G4 and G3 each have, in the vulcanized state, an elastic loss modulus G" of less than 1, G" being expressed in MPa (megapascals), the measurement of G" being taken at a shear strain of 10%, at 50° C. and at a frequency of 10 Hz. The definition of G" and the general test conditions are given in French Standard AFNOR NF T 46-026 of December 1984.

The rubber G4 therefore has a lower modulus G" than the corresponding rubbers of the outer region of standard beads having conventional bead wires, since these conventional rubbers have a modulus G" at least equal to 1.

Preferably, the rubber G4 has a modulus G" of less than 0.5 and advantageously a modulus G" of less than 0.1.

The fact that the assembly 40 extends above the top of the rim flange 60 makes it possible to stiffen the bead in this critical region and therefore to limit the wear in contact with the rim, and particularly in contact with the top of the rim flange, in such a way that a rubber G4 having a lower modulus G" than in conventional tires may be used. Another embodiment of the invention consists, as a result of the aforementioned stiffening, in decreasing the thickness of the rubber G4 with respect to conventional tires, this thickness being at most equal to 2 mm, while in conventional tires it is appreciably greater than 2 mm. In this latter embodiment of the invention, the rubber G4 may be the same as the rubbers G4 of the conventional tires, but it is also possible to combine these two embodiments, the rubber G4 then having a modulus G" of less than 1 and a thickness of at most equal to 2 mm. The use of a modulus G" of less than 1 and/or a thickness of at most equal to 2 mm for the rubber G4 of the tire 1 according to the invention makes it possible to decrease the hysteresis losses and therefore the heat-up of the rubber G4, thereby enabling the endurance of the bead 4, and therefore of the tire 1, to be increased while at the same time decreasing the rolling resistance.

The invention applies to cases in which the reinforcing plies 10A, 8, 9, 10B are not all staggered in height, for example to cases in which two of these plies have ends at the same height, a preferred characteristic being that there is a progressive decrease in the stiffness of the assembly 40 toward the crown 2, as a result of a progressive decrease in the thickness of this assembly toward the crown, the ends 10$b$, 9$a$, 8$a$, 10$a$ therefore not being all at the same height.

Means other than decreasing the thickness of the reinforcing plies in order to achieve this decrease in stiffness may be envisaged.

It may be envisaged that the rubbers G3 and G4 are the same, the rubber being single and continuous right along the element 40 and the sidewall 3, the line L43 no longer existing, which may have the advantage of simplifying the manufacture of the tire 1 as a result of the use of the same rubber for the sidewalls and the outer region of the bead. Preferably, the rubber G4 extends around the assembly 40 as far as a bottom inner portion of the bead 4 including the rubber tip 4$k$ comprising the bottom end 4$i$.

Superposition of the plies 10A, 8, 9, 10B is achieved, for example, without interposing rubber between them, and the carcass ply 5, while it is being turned up around the assembly 40, is in contact only with the assembly 40 and with the thin decoupling rubbers 11, 12, the thickness of these being about one millimeter. In contrast, the known tires having conventional bead wires include a significant mass of rubber, often called "filling rubber" or "bead-wire filling", between the turn-up of the carcass ply and the bead wire.

Figure 4:
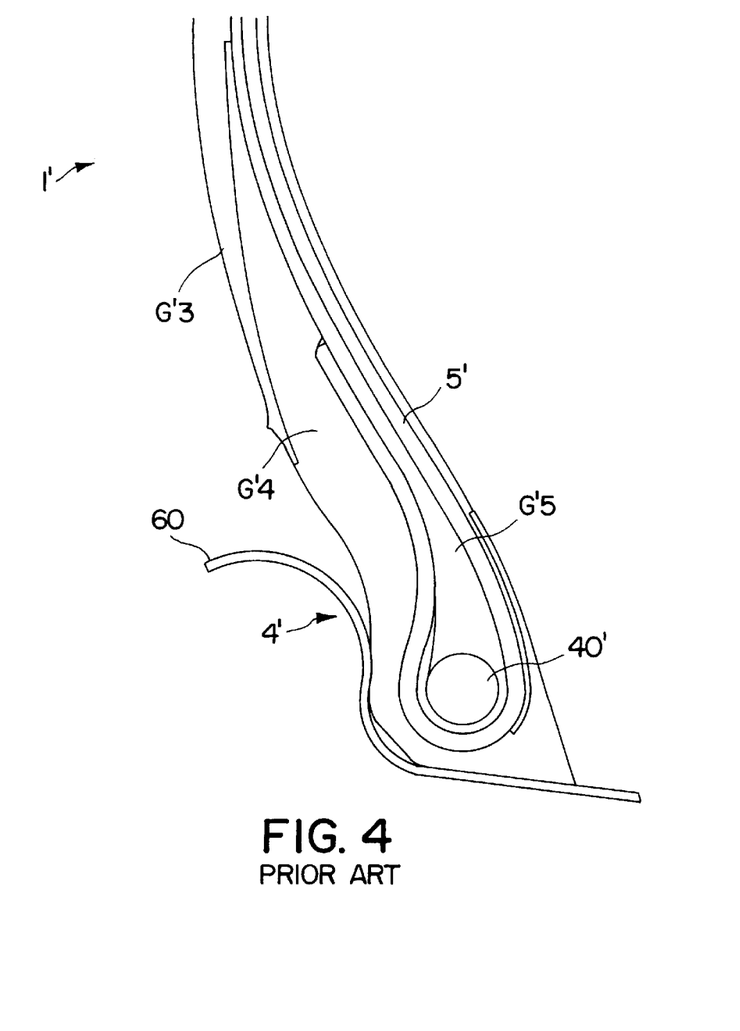
FIG. 4 shows, in radial cross section, a bead of a tire which is not according to the invention.

FIG. 4 shows, by way of example, a bead 4' of a known tire 1' with a conventional bead wire 40', a sidewall rubber G'3 and a rubber G'4 in the outer region of the bead 4', the modulus G" of which is at least equal to 1 and appreciably greater than the modulus G" of the sidewall rubber G'3, the thickness of this rubber G'4 being greater than 3 mm in order to avoid wear in contact with the rim and in particular with the top of the rim flange. A significant mass of rubber G'5 is placed between the turn-up of the carcass 5' and the bead wire 40'. This rubber G'5, which extends above the top of the rim flange in order to stiffen the bead a certain amount, has a very high modulus G", of about 8. The two rubbers G'4 and G'5 are therefore highly hysteretic and cause the bead 4 to heat up, as well as causing significant rolling resistance.

By way of example, the vulcanized tire 1 according to the invention has the following characteristics:

Size: 175/70R-13.

Crown plies 21, 22: known plies consisting of steel reinforcing cords making an angle of 21° with the equatorial plane, these reinforcing cords being crossed from one ply to the other.

Carcass ply 5: a conventional radial ply having polyester cords 51; M10 value of the rubber 50: 0.3 MPa.

Annular element 7: two turns of a cord consisting of an aramid plied yarn; tensile strength of the cord: 100 daN, the overall tensile strength, in the longitudinal direction, of the element 7 therefore being 200 daN.

Plies 10A, 8, 9, 10B: plies of the same kind with aramid cords;

for all the plies, the angle $\alpha$ is approximately equal to 5°, these cords being crossed from one ply to another:

tensile strength, measured for each ply, in the direction of the cords in the ply: 5000 daN/dm of ply width, the tensile strength, measured in the longitudinal direction of the combination 40A being approximately equal to 3500 daN;

M10 value of the (identical) rubbers 80, 90, 100: 2.4 MPa.

Decoupling rubbers 11, 12:

M10 value: 0.6 MPa for the rubber 12 and 0.8 for the rubber 11, these rubbers 11, 12 have a thickness of 0.8 mm and G" value of less than that of the rubbers 80, 90, 100, 50.

The rubbers G3 and G4 are the same and form a single rubber having a G" value equal to 0.08 MPa and a thickness of 1.5 mm near the top of the rim flange 60.

The diameter of the set of points 4j is 322 mm before fitting onto the rim 6, this diameter on the rim being 328 mm, which therefore represents a decrease in diameter of 6 mm.

The heights H10a, H8a, H9a, H10b are respectively 30 mm, 20 mm, 15 mm, 12 mm.

The height H60 of the top of the rim flange 60 is between H8a and H9a.

Weight of the tire: 6.3 kg.

On the other hand, a known tire, of the same size 175/70R-13, is produced which is identical to the tire of the invention apart from the following differences:

The reinforcing assembly 40 is replaced by a conventional metal bead wire, the tensile strength of which, measured in the longitudinal direction, is 2000 daN.

It includes a sidewall rubber identical to the aforementioned rubber G3 and a rubber G'4 having a G" of 1 MPa, the thickness of which in the region of the top of the rim flange is 3 mm.

It includes a rubber G'5, serving as a bead-wire filling, having a G" of 8 MPa and a significant weight (231 g).

The diameter of the points 4j, before the tire is fitted onto the known rim 6, identical to that onto which the tire according to the invention is fitted, is 325 mm, the difference in diameter of the points 4j therefore being 3 mm, the difference in the diameters of the points 4j between the known tire and the tire according to the invention, in the free state, i.e. before fitting onto the rim, therefore being 0.9%.

It has a weight of 6.8 kg.

For both tires, the definitions and conditions of determining G" and M10 are those given above.

It is therefore found that the invention enables a decrease in weight of more than 7% to be achieved.

The two tires are subjected to a speed limit test, to a rolling resistance test and to an endurance test.

Speed Limit Test

The tires are inflated to the maximum pressure stipulated by ETRTO (European Tyre and Rim Technical Organization) for these covers, i.e. 2.5 bars, and the maximum load stipulated by ETRTO, i.e. 466 daN, is applied to them. Next, the tires are made to roll, the speed being increased until the tires die, which occurs at a speed of 215 km/h.

It is found that in both cases the deterioration of the tire at the end of rolling is due to failure of the crown 2, not to the assembly 40 according to the invention or to the conventional bead wire. The two tires therefore have similar behavior in terms of the speed limit.

Rolling Resistance

The rolling resistance is determined in accordance with the ISO 8767 standard of 1992, at 80 km/h. It is found that the tire according to the invention enables the rolling resistance to be decreased by approximately 1 kg/t, i.e. a decrease of approximately 10%, compared to the known tire. The invention therefore enables the rolling resistance to be appreciably decreased, in particular as a result of the decrease in the hysteresis of the rubber G4 and of the absence of the rubber, serving as bead-wire filling, used in the known tire.

Endurance

The tires are made to roll at the normal pressure stipulated by ETRTO (approximately 2 bars), the known tire being subjected to the maximum load stipulated by ETRTO (466 daN) and the tire of the invention being subjected to a load of 30% greater than this maximum load. It is then found that the tires can roll without any damage for the same length of time, that is to say that the tire according to the invention has the same endurance as the known tire if this tire according to the invention is subjected to a 30% overload with respect to the known tire.

The tire according to the invention therefore exhibits much better endurance than the known tire for the same load. This beneficial effect of the invention is again essentially due to the decrease in the hysteresis of the rubbers used to build this tire, as described above.

In summary, the invention has the following advantages:

the tire is simple and economic to produce since there is no prior manufacture of a bead wire;

the presence of the element 7 enables the plies 10A, 8, 9, 10B to be precisely and reproducibly positioned, without any other holding element;

the use of a rubber having a low elastic loss modulus G" and/or having a small thickness in the outer region of the bead is permitted because of the stiffness of the reinforcing assembly according to the invention which extends over that entire region of the bead which is intended to come into contact with the rim, this stiffness reducing the wear in contact with the rim; this use appreciably decreases the rolling resistance without in any way adversely affecting the quality with which the tire is held in place by the rim, and this use also allows the endurance of the tire to be increased as a result of the decrease in hysteresis of the rubber used in contact with the rim; in addition, preferably:

the presence of the decoupling rubbers 11, 12, as well as the progressive decrease in the stiffness of the assembly 40 toward the top of the tire, allows the shearing effects between the radial carcass ply and the longitudinally stiff assembly 40 as well as a progressive transition between the stiffness of the beads 4 and the compliance of the sidewalls 3; this increases the endurance of the tire and decreases the wear in contact with the rim, in particular in the region of the top of the rim flange;

the absence of a substantial amount of rubber in the turn-up of the carcass decreases the weight and the cost of the tire; it also decreases the rolling resistance and enables the endurance of the tire to be increased as a result of the decrease in hysteresis, in a way similar to that which was described above.

The tire according to the invention may be manufactured according to known processes, for example processes similar to those described in the aforementioned Patent Application EP-A-672,547, these processes not being given in detail here for the sake of simplifying matters.

Of course, the invention is not limited to the embodiment examples described above.

Thus, for example, the assembly 40 could be composed only of two reinforcing plies, for example the plies 8, 9 or the plies 10A, 10B.

Moreover, the plies 8, 9 could be close to the element 7, for example by being separated from this element by a thin rubber, for example one having a thickness of less than 5 mm, and the plies 8, 9, 10 could be different, for example using rubbers of different moduli, and only one decoupling rubber could be used.

Moreover, plies 8, 9 may be produced by folding a single ply.

Figure 5:
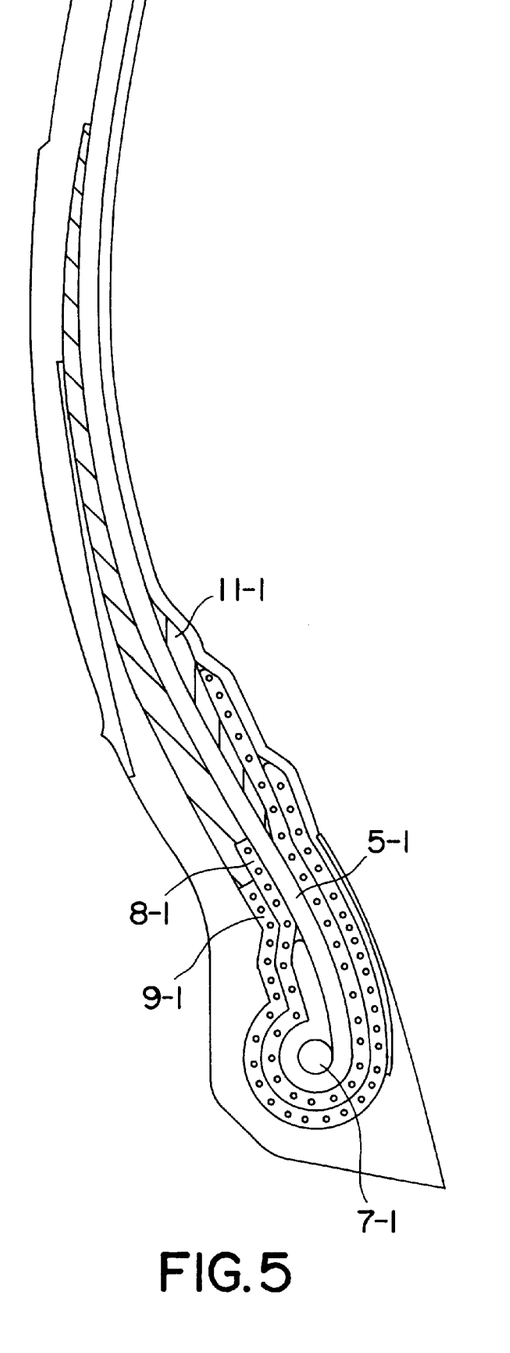
FIG. 5 shows, in radial cross section, a bead of another tire according to the invention.

Cases may also be envisaged in which the carcass ply is arranged between reinforcing plies, as shown in FIG. 5, in which the carcass ply 5-1 is wrapped directly around the annular element 7-1, at least one reinforcing ply such as the two reinforcing plies 8-1 and 9-1 being wrapped around the carcass ply 5-1 and the element 7-1.

In addition, the invention applies to tires whose carcasses are not radial.

We claim:

1. A pneumatic tire which includes a crown, two beads and at least one carcass ply extending from one bead to the other, characterized in that each bead has the following features:
   a) it has no bead wire and includes an annular element whose tensile strength in the longitudinal direction is appreciably less than that which would be necessary for a bead wire in a known tire of the same size, the axis of this annular element being the axis of revolution of the tire;
   b) at least two adjacent plies called reinforcing plies are placed in contact with the annular element, or near this annular element; these reinforcing plies each include mutually parallel reinforcing cords, these cords being crossed from one ply to another; in each reinforcing ply, the angle $\alpha$ is the acute angle formed, at any point on a cord, by the direction of this cord and the tangent to a circle having as axis the axis of revolution of the tire and passing through this point on the cord, this angle $\alpha$ satisfying the relationship $0°<\alpha\leq10°$, the measurement being taken in a region where the reinforcing plies are practically oriented in mutually parallel planes;
   c) the combination of the reinforcing plies has a tensile strength, measured in the longitudinal direction, at least equal to that which would be necessary for a bead wire in a known tire of the same size;
   d) the at least one carcass ply is wrapped around the annular element; and
   e) that outer region of the bead which is intended to be placed on the side of a standard rim, at least in the area of the top of the rim flange, when the tire is fitted onto this rim, fulfills at least one of the following conditions:
   it is composed of a rubber which, in the vulcanized state, has an elastic loss modulus G" of less than 1, G" being expressed in MPa (megapascals), the measurement of G" being taken at a shear strain of 10%, at 50° C. and at a frequency of 10 Hz;
   it is composed of a rubber whose thickness is at most equal to 2 mm.

2. A tire according to claim 1, characterized in that it is devoid of filling rubber in the region where the at least one carcass ply is wrapped around the annular element.

3. A tire according to claim 1, characterized in that, when the tire is fitted onto the standard rim for which it is intended, the upper end of the reinforcing plies lies above the level of the height of the top of the rim flange, the stiffness of the bead thus extending above the top of the rim flange, toward the crown.

4. A tire according to claim 1, characterized in that the stiffness of the combination of plies decreases progressively toward the crown.

5. A tire according to claim 4, characterized in that this progressive decrease in the stiffness is obtained by a progressive decrease in the thickness of the combination of plies toward the crown.

6. A tire according to claim 1, characterized in that points on the bottom surface of the bead, under the reinforcing plies and under the annular element, when the tire is in the free state, i.e. not fitted onto the standard rim for which it is intended, lie closer to the axis of rotation of the tire than in a known tire having a conventional bead wire, the diameter of the circle formed by these points around this axis being less than the corresponding diameter of such a known tire, the difference in these diameters being between 0.5% and 5%.

7. A tire according to claim 1, characterized in that the at least one carcass ply, and each reinforcing ply, comprises a rubber, the M10 modulus of the carcass rubber being appreciably less than the M10 modulus of each of the reinforcing-ply rubbers.

8. A tire according to claim 7, characterized in that it includes at least one rubber, called a decoupling rubber, which is arranged between the at least one carcass ply and the combination of reinforcing plies, the M10 modulus of this decoupling rubber being between the M10 modulus of the carcass rubber and the M10 modulus of each reinforcing-ply rubber.

9. A tire according to claim 1, characterized in that the annular element has a tensile strength, measured in the longitudinal direction, of less than 500 daN.

10. A tire according to claim 9, characterized in that the annular element has a tensile strength, measured in the longitudinal direction, of less than 300 daN.

11. A tire according to claim 1, characterized in that the tensile strength, measured in the longitudinal direction, of the combination of reinforcing plies is greater than 800 daN.

12. A tire according to claim 11, characterized in that the tensile strength, measured in the longitudinal direction, of the combination of reinforcing plies is greater than 1000 daN.

13. A tire according to claim 1, characterized in that the at least one carcass ply is wrapped around the combination of reinforcing plies.

14. A tire according to claim 1, characterized in that at least one reinforcing ply is wrapped around the at least one carcass ply and the annular element.

15. A tire according to claim 1, characterized in that the at least one carcass ply is radial.

* * * * *

UNITED STATES PATENT AND TRADEMARK OFFICE
CERTIFICATE OF CORRECTION

PATENT NO. : 5,961,756
DATED : October 5, 1999
INVENTOR(S) : Ahouanto, et al.

It is certified that error appears in the above-identified patent and that said Letters Patent is hereby corrected as shown below:

Col. 3, line 34: "yams" should read -- yarns --;

Col. 3, line 35: "yams." should read -- yarns--;

Col. 3, line 36: "vary it" should read -- vary – it --.

Signed and Sealed this

Twentieth Day of June, 2000

*Attest:*

Q. TODD DICKINSON

*Attesting Officer*  *Director of Patents and Trademarks*